(12) United States Patent
Ohlsen et al.

(10) Patent No.: US 7,105,245 B2
(45) Date of Patent: Sep. 12, 2006

(54) FLUID CELL SYSTEM REACTANT SUPPLY AND EFFLUENT STORAGE CARTRIDGES

(75) Inventors: Leroy J. Ohlsen, Goldbar, WA (US); Steven C. Tallman, Everett, WA (US); George W. Hawkins, South East Bothell, WA (US)

(73) Assignee: Neah Power Systems, Inc., Bothell, WA (US)

( * ) Notice: Subject to any disclaimer, the term of this patent is extended or adjusted under 35 U.S.C. 154(b) by 529 days.

(21) Appl. No.: 10/613,887

(22) Filed: Jul. 2, 2003

(65) Prior Publication Data

US 2004/0096721 A1 May 20, 2004

Related U.S. Application Data

(60) Provisional application No. 60/393,632, filed on Jul. 3, 2002.

(51) Int. Cl.
*H01M 8/04* (2006.01)

(52) U.S. Cl. .......................................... 429/34
(58) Field of Classification Search .................. 429/17, 429/34, 39
See application file for complete search history.

(56) References Cited

U.S. PATENT DOCUMENTS

| | | | |
|---|---|---|---|
| 5,723,229 A * | 3/1998 | Scheifers et al. | 429/19 |
| 5,778,679 A * | 7/1998 | Celorier et al. | 62/47.1 |
| 5,914,199 A | 6/1999 | Carter et al. | |
| 6,471,850 B1 | 10/2002 | Shiepe et al. | |
| 6,558,825 B1 * | 5/2003 | Faris et al. | 429/17 |
| 6,924,054 B1 * | 8/2005 | Prasad et al. | 429/34 |
| 2002/0000385 A1 | 1/2002 | Shiepe et al. | |
| 2002/0127141 A1 | 9/2002 | Acker | |
| 2002/0172851 A1 | 11/2002 | Corey et al. | |
| 2003/0006145 A1 | 1/2003 | Shiepe et al. | |
| 2003/0031907 A1 | 2/2003 | Gottesfeld | |
| 2003/0082427 A1 | 5/2003 | Prasad et al. | |
| 2003/0148166 A1 * | 8/2003 | DeJohn et al. | 429/34 |
| 2003/0215686 A1 | 11/2003 | DeFilippis et al. | |

* cited by examiner

*Primary Examiner*—Gregg Cantelmo
(74) *Attorney, Agent, or Firm*—Thomas E. Loop

(57) ABSTRACT

Reactant supply and effluent storage cartridges adapted for use with a closed liquid feed fuel cell system, as well as closed liquid feed fuel cell systems. The cartridge includes at least first and second volumes and comprises: a first reactant reservoir for holding a first reactant, the first reactant reservoir being configured to occupy substantially all of the first volume when filled with the first reactant; a second reactant reservoir for holding a second reactant, the second reactant reservoir being configured to occupy substantially all of the second volume when filled with the second reactant; and an effluent reservoir for holding effluent produced by the fuel cell system, the effluent reservoir being configured to occupy, when filled with the effluent produced by the fuel cell system, a portion of the first volume, a portion of the second volume, or a portion of the first and second volumes. The reactant supply cartridge of may further comprise an electrolyte reservoir for holding an electrolyte. In other embodiments, the present invention is directed to a computer system comprising the detachable cartridges and closed liquid feed fuel cell systems disclosed herein.

6 Claims, 10 Drawing Sheets

FLUID CELL SYSTEM REACTANT SUPPLY AND EFFLUENT STORAGE CARTRIDGES

CROSS-REFERENCE TO RELATED APPLICATION

This application claims the benefit of U.S. Provisional Application No. 60/393,632 filed Jul. 3, 2002, which application is incorporated herein by reference in its entirety.

TECHNICAL FIELD

The present invention relates generally to fuel cell systems and, more specifically, to detachable reactant supply and effluent storage cartridges adapted for use with closed liquid feed fuel cell systems, as well as to closed liquid feed fuel cell systems.

BACKGROUND OF THE INVENTION

A fuel cell is an energy conversion device that consists essentially of two opposing electrodes, an anode and a cathode, ionically connected together via an interposing electrolyte. Unlike a battery, fuel cell reactants are supplied externally rather than internally. Fuel cells operate by converting fuels, such as hydrogen or a hydrocarbon (e.g., methanol), to electrical power through an electrochemical process rather than combustion. It does so by harnessing the electrons released from controlled oxidation-reduction reactions occurring on the surface of a catalyst. A fuel cell can produce electricity continuously so long as fuel and oxidant are supplied from an outside source.

In conventional electrochemical fuel cells employing methanol as the fuel supplied to the anode (also commonly referred to as a "Direct Methanol Fuel Cell (DMFC)" system), the electrochemical reactions are essentially as follows: first, a methanol molecule's carbon-hydrogen, and oxygen-hydrogen bonds are broken to generate electrons and protons; simultaneously, a water molecule's oxygen-hydrogen bond is also broken to generate an additional electron and proton. The carbon from the methanol and the oxygen from the water combine to form carbon dioxide. Oxygen from air (supplied to the cathode) is likewise simultaneously reduced at the cathode. The ions (protons) formed at the anode migrate through the interposing electrolyte and combine with the oxygen at the cathode to form water. From a molecular perspective, the electrochemical reactions occurring within a direct methanol fuel cell (DMFC) system are as follows:

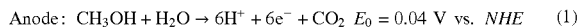
Anode: $CH_3OH + H_2O \rightarrow 6H^+ + 6e^- + CO_2$  $E_0 = 0.04$ V vs. $NHE$  (1)

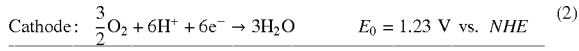
Cathode: $\frac{3}{2}O_2 + 6H^+ + 6e^- \rightarrow 3H_2O$  $E_0 = 1.23$ V vs. $NHE$  (2)

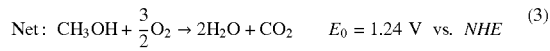
Net: $CH_3OH + \frac{3}{2}O_2 \rightarrow 2H_2O + CO_2$  $E_0 = 1.24$ V vs. $NHE$  (3)

The various electrochemical reactions associated with other state-of-the-art fuel cell systems (e.g., hydrogen or carbonaceous fuel) are likewise well known to those skilled in the art of fuel cell technologies.

With respect to state-of-the-art fuel cell systems generally, several different configurations and structures have been contemplated. In this regard, existing fuel cell systems are typically classified based on one or more criteria, such as, for example: (1) the type of fuel and/or oxidant used by the system, (2) the type of electrolyte used in the electrode stack assembly, (3) the steady-state operating temperature of the electrode stack assembly, (4) whether the fuel is processed outside (external reforming) or inside (internal reforming) the electrode stack assembly, and (5) whether the reactants are fed to the cells by internal manifolds (direct feed) or external manifolds (indirect feed). In general, however, it is perhaps most customary to classify existing fuel cell systems by the type of electrolyte (i.e., ion conducting media) employed within the electrode stack assembly. Accordingly, most state-of-the-art fuel cell systems have been classified into one of the following known groups:

1. Alkaline fuel cells (e.g., KOH electrolyte);
2. Acid fuel cells (e.g., phosphoric acid electrolyte);
3. Molten carbonate fuel cells (e.g., $Li_2CO_3/K_2CO_3$ electrolyte);
4. Solid oxide fuel cells (e.g., yttria-stabilized zirconia electrolyte);
5. Proton exchange membrane fuel cells (e.g., NAFION electrolyte).

Although these state-of-the-art fuel cell systems are known to have many diverse structural and operational characteristics, such systems nevertheless share many common fuel and oxidant flow stream and path characteristics. Unfortunately, existing state-of-the-art fuel and oxidant flow regimes are not entirely satisfactory for the production of small-scale portable direct feed fuel cell systems. Moreover, existing fuel cell technology has not addressed many of the concomitant problems associated with making and using direct circulating liquid feed fuel cell systems adapted for use with portable electronic devices. Accordingly, there is still a need in the art for new and improved fuel cell systems (including related sub-components and methods) that have, among other things, improved fuel and oxidant flow regimes to thereby enable better utilization of the fuel cell system's supply of reactants (i.e., fuel and oxidants). The present invention fulfills these needs and provides for further related advantages.

SUMMARY OF THE INVENTION

In brief, the present invention relates generally to fuel cell systems and, more specifically, to detachable reactant supply and effluent storage cartridges adapted for use with closed liquid feed fuel cell systems, as well as to closed liquid feed fuel cell systems.

In one embodiment, the present invention is directed to a reactant supply cartridge adapted for use with a closed liquid feed fuel cell system, the cartridge having at least first and second volumes, comprising: a first reactant reservoir for holding a first reactant, the first reactant reservoir being configured to occupy substantially all of the first volume when filled with the first reactant; a second reactant reservoir for holding a second reactant, the second reactant reservoir being configured to occupy substantially all of the second volume when filled with the second reactant; and an effluent reservoir for holding effluent produced by the fuel cell system, the effluent reservoir being configured to occupy, when filled with the effluent produced by the fuel cell system, a portion of the first volume, a portion of the second volume, or a portion of the first and second volumes. The reactant supply cartridge of may further comprise an electrolyte reservoir for holding an electrolyte.

In another embodiment, the present invention is directed to a closed liquid feed fuel cell system, comprising: a housing structure that retains one or more electrode pair assemblies, wherein each electrode pair assembly comprises an anode in operative arrangement with a cathode; and a detachable cartridge in fluid communication with the housing structure, the detachable cartridge comprising a fuel reservoir for holding a first reactant within a first volume, an oxidant reservoir for holding a second reactant within a second volume, and an effluent reservoir for holding effluent within either (i) a portion of the first and second volumes, or (ii) a portion the second volume. The first reactant may be a methanol solution and the second reactant may be a hydrogen peroxide solution.

In still other embodiments, the present invention is directed to a computer system comprising the detachable cartridges and closed liquid feed fuel cell systems disclosed herein.

These and other aspects of the several inventive embodiments disclosed herein will become more evident upon reference to the following detailed description and attached drawings. It is to be understood, however, that various changes, alterations, and substitutions may be made to the specific embodiments (including related sub-components and methods) disclosed herein without departing from their essential spirit and scope. In addition, it is to be further understood that the drawings are intended to be illustrative and symbolic representations of exemplary embodiments of the embodiments disclosed herein (hence, they are not necessarily to scale).

DETAILED DESCRIPTION OF THE INVENTION

As noted above, the present invention relates generally to fuel cell systems and, more specifically, to detachable reactant supply and effluent storage cartridges adapted for use with closed liquid feed fuel cell systems, as well as to closed liquid feed fuel cell systems. The detachable cartridges and fuel cell systems disclosed herein are particularly useful for powering portable electronic devices such as, for example, laptop computers, portable radios, portable televisions, portable compact disk players, portable electronic measuring devices, palm devices, personal digital assistants, and the like. As is appreciated by those skilled art, a fuel cell system generally comprises a stack of electrode pair assemblies (commonly referred to as a fuel cell electrode stack assembly), wherein each individual electrode pair assembly consists essentially of two opposing electrode structures, an anode and a cathode, ionically connected together via an interposing electrolyte. The electrode stack assemblies of direct liquid feed fuel cell systems, for example, also generally include a series of flow channels for flowing reactant streams (i.e., fuel and oxidant streams) adjacent to and/or through discrete regions of the electrode structures.

Figure 1:
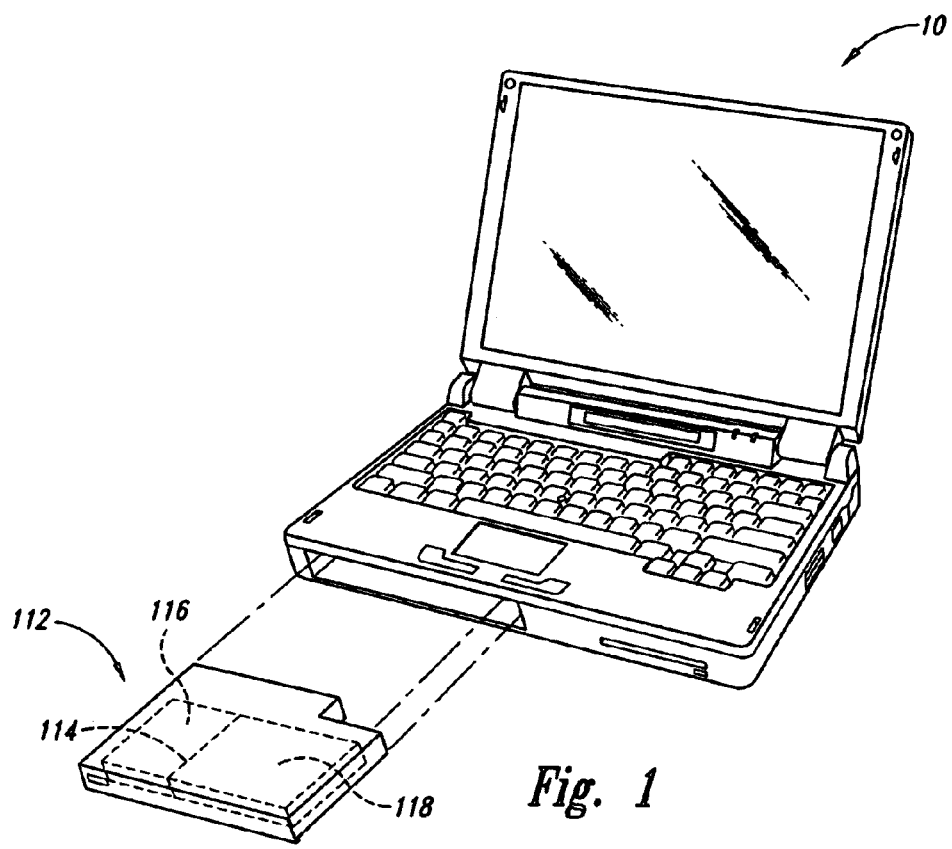
FIG. 1 is a perspective view of a portable laptop computer having a removable fuel cell system sub-component (shown removed) in accordance with an embodiment of the present invention.
Figure 2:
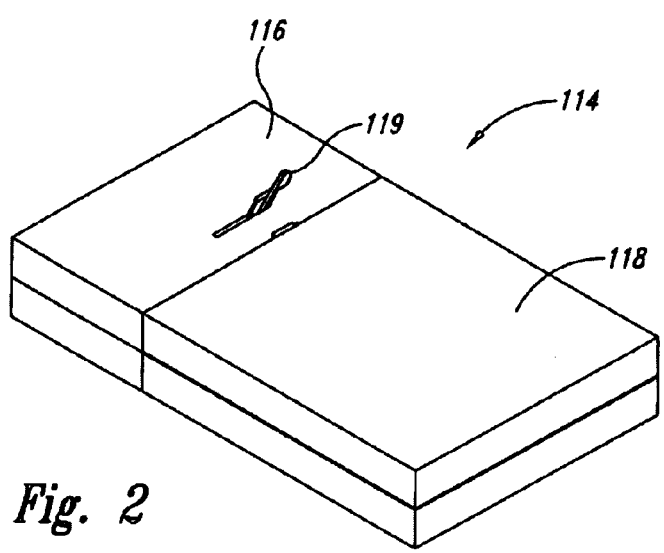
FIG. 2 is a perspective view of a fuel cell system that includes a housing structure that retains one or more electrode pair assemblies (not shown) and a detachable cartridge in fluid communication with the housing structure in accordance with an embodiment of the present invention.

An exemplary device in accordance with one embodiment of the present invention is shown generally in FIGS. 1 and 2. As shown in FIG. 1, a laptop computer 110 is configured to detachably engage a miniaturized fuel cell system 112 in lieu of a conventional battery. The fuel cell system 112 includes a two-part housing compartment 114 (shown in dashed lines) that includes a stack assembly housing 116 for holding one or more electrode pair assemblies and other ancillary components such as, for example, pumps, converters, and electronic circuitry (not shown) and a detachable cartridge 118 that fluidicly communicates with the stack assembly housing 116. The detachable cartridge 118 is configured to hold a liquid fuel and a liquid oxidant, as well as the effluent produced by the fuel cell system 112 when in operation. As shown in FIG. 2, the two-part housing compartment 114 may be separated into the stack assembly housing 116 and the detachable cartridge 118 by use of latching mechanism 119.

Figure 3:
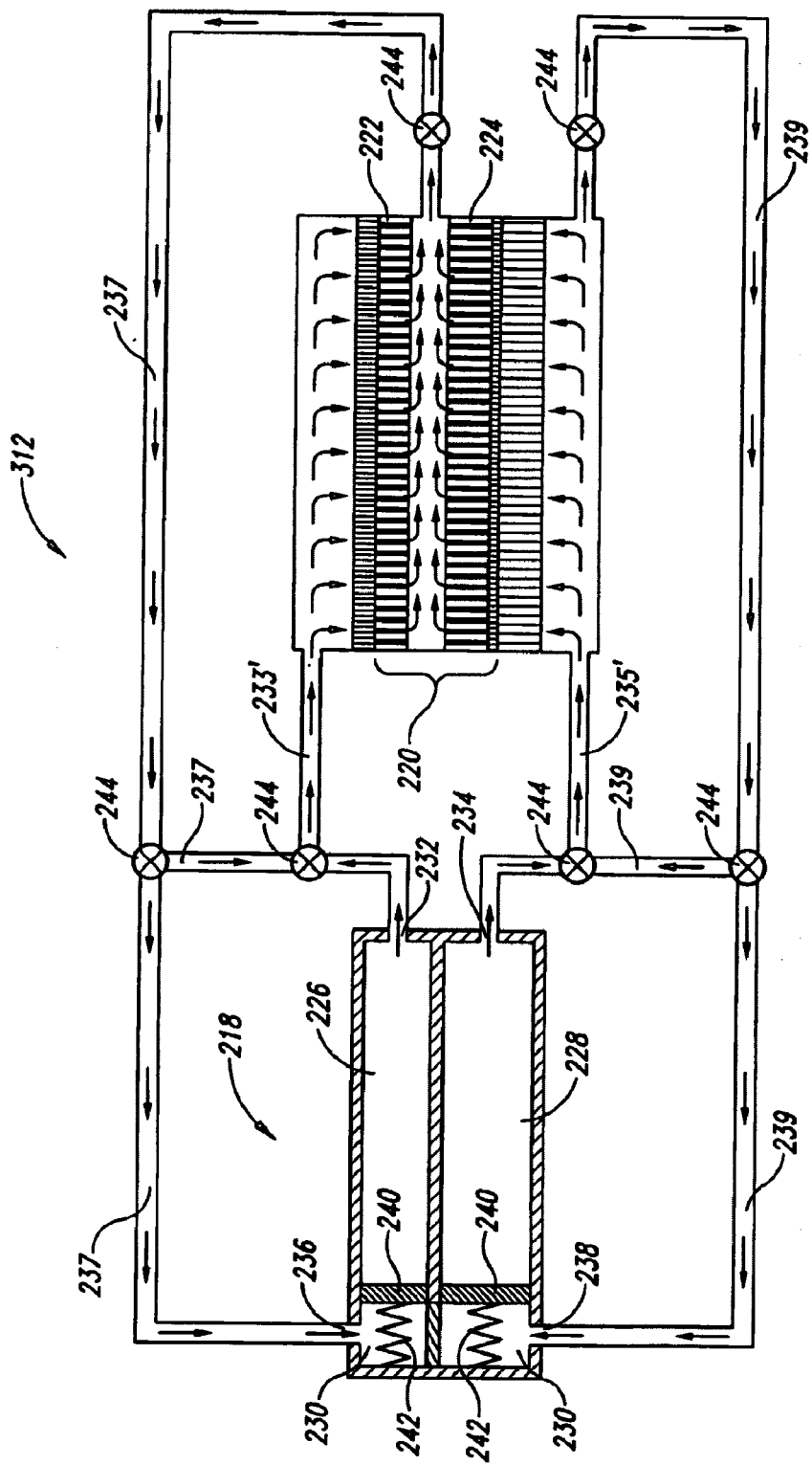
FIG. 3 illustrates a simplified process flow diagram of a closed liquid feed fuel cell system in accordance with an embodiment of the present invention.

The various detachable cartridges disclosed herein are each adapted to be used as an integral component of a closed liquid feed fuel cell system, which, in turn, is adapted to be engagable with a portable electronic device. A highly simplified process flow diagram of an exemplary closed liquid fuel (e.g., $CH_3OH$ solution) and liquid oxidant (e.g., $H_2O_2$ solution) fuel cell system is shown in FIG. 3. As shown, the closed liquid feed fuel cell system 312 includes a stack assembly component 316 and a reactant supply cartridge component 318. The stack assembly component 316 includes one or more electrode pair assemblies 320, wherein each electrode pair assembly 320 includes a flow-through anode 322 and an opposing flow-through cathode 324. Unlike conventional direct methanol fuel cell systems that utilize a "solid polymer electrolyte" (SPE) membrane as the interposing electrolyte (of an electrode pair assembly), the closed liquid feed fuel cell systems associated with the present invention utilize unique flow-through electrode pair assemblies in which parallel liquid flow streams having an acidic electrolyte component (e.g., $H_2SO_4$) serves as the interposing electrolyte (optionally with a metallic flow separation plate or membrane). In other words, the interposing electrolyte associated with the flow-through electrode assemblies consists essentially of an acidic component that circulates in the anode and cathode feed solutions, as well as in the reaction byproduct flow streams exiting from the respective flow-through anode and cathode structures. Suitable flow-through electrode pair assemblies are disclosed in commonly owned PCT Publication No. WO 01/37357, which publication is incorporated herein by reference in its entirety.

As also shown in FIG. 3, the cartridge component 318 of the closed liquid feed fuel cell system 312 includes a first compressible reactant reservoir 326 for holding a first reactant such as an organic liquid fuel having an electrolyte component (e.g., methanol solution with sulfuric acid additive), a second compressible reactant reservoir 328 for holding a second reactant such as a liquid oxidant having an electrolyte component (e.g., hydrogen peroxide solution with sulfuric acid additive), and one or more expandable effluent reservoirs 330 for holding effluent (e.g., water and carbon dioxide) produced by the stack assembly component 316. The first compressible reactant reservoir 326 and the second compressible reactant reservoir 328 initially occupy first and second volumes, respectively, when completely filled with appropriately selected reactants. However, during operation of the fuel cell system 312 the reactants are depleted and, simultaneously, effluent is produced. Thus, as first and second reactant flow streams 333, 335 are removed from the first and second compressible reactant reservoirs 326, 328 via first and second outlet ports 332, 334, the simultaneously produced first and second effluent flow streams 337, 339 are routed back into the one or more expandable effluent reservoirs 330 via first and second inlet ports 336, 338. In this way, the produced effluent will eventually occupy substantially all of the first and/or second volumes (when all of the first and second reactants are depleted).

As further shown in FIG. 3, one or more movable barrier members 340 separates the first and second compressible reactant reservoirs 326, 328 from the one or more expandable effluent reservoirs 330. Each of the one or more movable barrier members 332 is configured to move as the first and second reactants are removed, thereby decreasing the volume of reactant reservoirs 326, 328 while simultaneously increasing the volume of the effluent reservoir(s) 330. The movement of the one or more barrier members 332 may be facilitated by use of corresponding spring mechanisms 342. In addition, a plurality of controllable and selectively placed valves 344 for regulating the flow rates of reactants and effluent flow streams 333, 335, 337, 339 through the fuel cell system 312 is generally preferred. Finally, and in some embodiments and as shown, portions of the first and second effluent flow streams 337, 339 may be selectively recycled back into the stack assembly component 316 by selective routing back into portions of the first and second reactant flow streams 333, 335, thereby yielding diluted first and second reactant flow streams 333', 335'.

Figure 4:
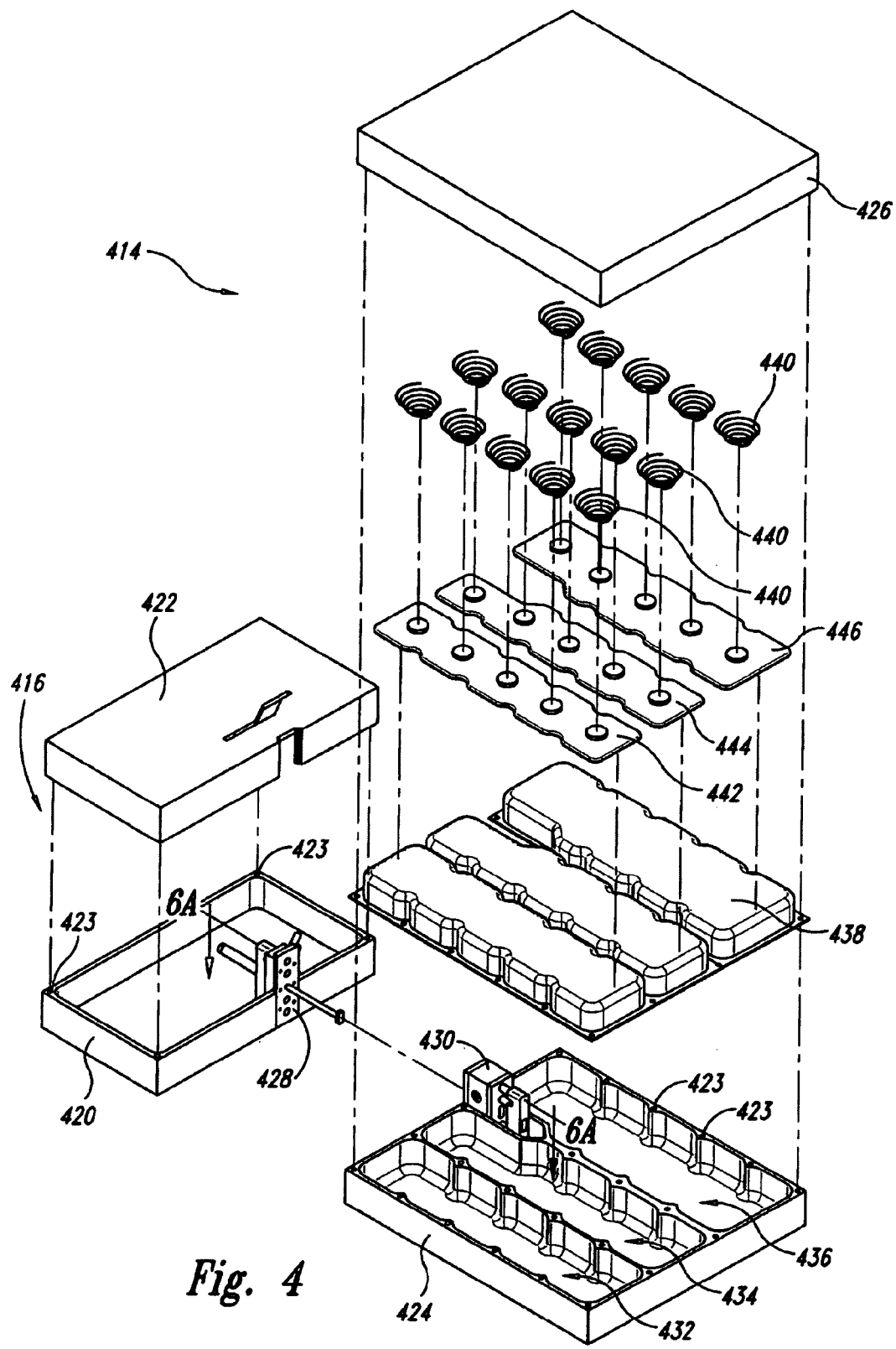
FIG. 4 is an exploded perspective view of an exemplary two-part housing structure that includes a stack assembly housing and a detachable cartridge, wherein the detachable cartridge includes two liquid oxidant reservoirs and a single liquid fuel reservoir.

FIG. 4 illustrates in greater detail the two-part housing compartment 414 depicted in FIGS. 1 and 2, including various features associated with the stack assembly housing 416 and detachable cartridge 418. As shown in exploded view, the stack assembly housing 416 (shown with no stack assembly or ancillary components) includes a base housing portion 420 and a top housing portion 422, both of which may be connected together by a plurality of screws (not shown) fitted through a plurality of screw holes 423. Similarly, the detachable cartridge 418 includes a base cartridge portion 424 and a top cartridge portion 426, both of which may also be connected together by a plurality of screws (not shown) fitted through a plurality of like screw holes 423. Preferably, the base housing portion 420, the top housing portion 422, the base cartridge portion 424, and the top cartridge portion 426 are all machined from a rigid plastic material such as, for example, an acrylic plastic, a polyvinyl chloride plastic, or a polyvinylidene fluoride plastic.

As shown, the stack assembly housing 416 also includes a first key portion 428 (also referred to as a main fluid connector assembly) whereas the detachable cartridge 418 includes a second key receiving portion 430 (also referred to as a cartridge fluid connector assembly). When engaged, the first key portion 428 and the second key receiving portion 430 constitute a fluid transfer interlock mechanism (best shown in FIG. 5) that is configured to fluidicly connect and lock together a fuel cell stack assembly (not shown) contained within the stack assembly housing 416 with the detachable cartridge 418. The fluid transfer interlock mechanism facilitates the leak-free transfer of reactants (i.e., liquid fuel and oxidant solutions) and reaction by products (i.e., effluent) between the stack assembly (not shown) and the detachable cartridge 418.

As further shown, the detachable cartridge 418 also includes first, second, and third reservoirs 432, 434, 436. The first and second reservoirs 432, 434 are configured to hold a total of about 103.2 ml of a liquid oxidant solution (e.g., hydrogen peroxide solution with sulfuric acid additive), whereas the third reservoir 436 is configured to hold about 68.2 ml of a liquid reactant solution (e.g., methanol solution with sulfuric acid additive). Each of the first, second, and third reservoirs 432, 434, 436 are bifurcated into respective first and second volumes by means of an interposing bladder member 438. The interposing bladder member 438 is preferable formed from a liquid impervious flexible membrane material such as, for example, a synthetic rubber. In addition, the interposing bladder member 438 is adapted to separate the liquid reactant and oxidant solutions from the returning effluent during operation of the closed fuel cell system.

Although a simple mechanical pump (such as, for example, a microfluidic gear pump with a stepper motor) may be used to transport the various fluids throughout the system, the embodiment shown in FIG. 4 utilizes a series of selectively placed coil springs 440 to effectuate fluid transport. That is, a series of compressed coil springs 440 are evenly positioned along top surfaces of respective first, second, and third rigid pressure distribution members 442, 444, 446, which, in turn, are positioned above the first, second, and third reservoirs 432, 434, 436, respectively, and a top surface of the interposing bladder member 438. The first, second, and third rigid pressure distribution members 442, 444, 446 may be made of either a thin rigid plastic or metal sheet. In this configuration, the energy stored in the compressed coil springs 440 is used to collapse the interposing bladder member 438 thereby forcing the liquid oxidant solution (contained in the first and second reservoirs 432, 434) and the liquid reactant solution (contained in the third reservoir 436) into the fuel cell stack assembly (not shown). Simultaneously, the effluent produced by the stack assembly during operation is selectively forced back into the first and second reservoirs 432, 434, and/or the third reservoir 436.

Figure 5:
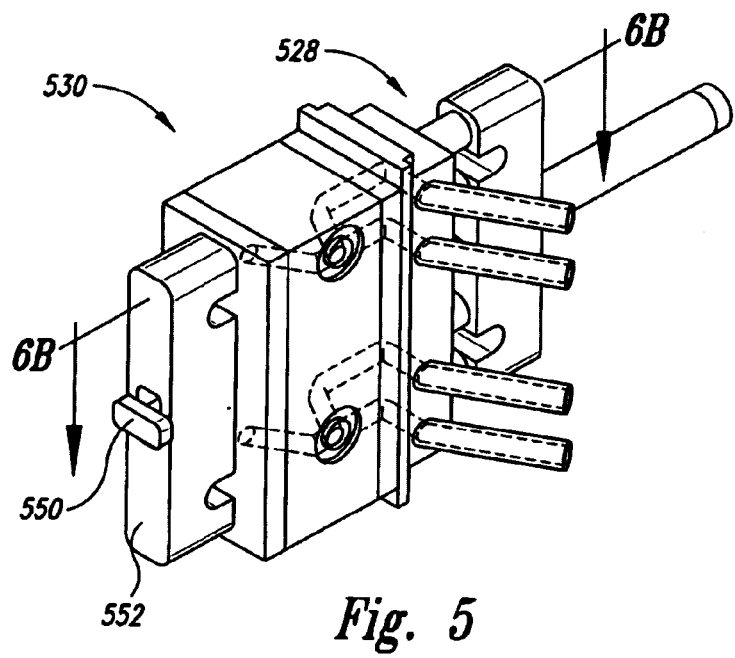
FIG. 5 is a perspective view of a fluid transfer interlock mechanism that is configured to fluidicly connect and lock together a stack assembly (contained with a stack assembly housing) and a detachable cartridge in accordance with an embodiment of the present invention.
Figures 6A, 6B:
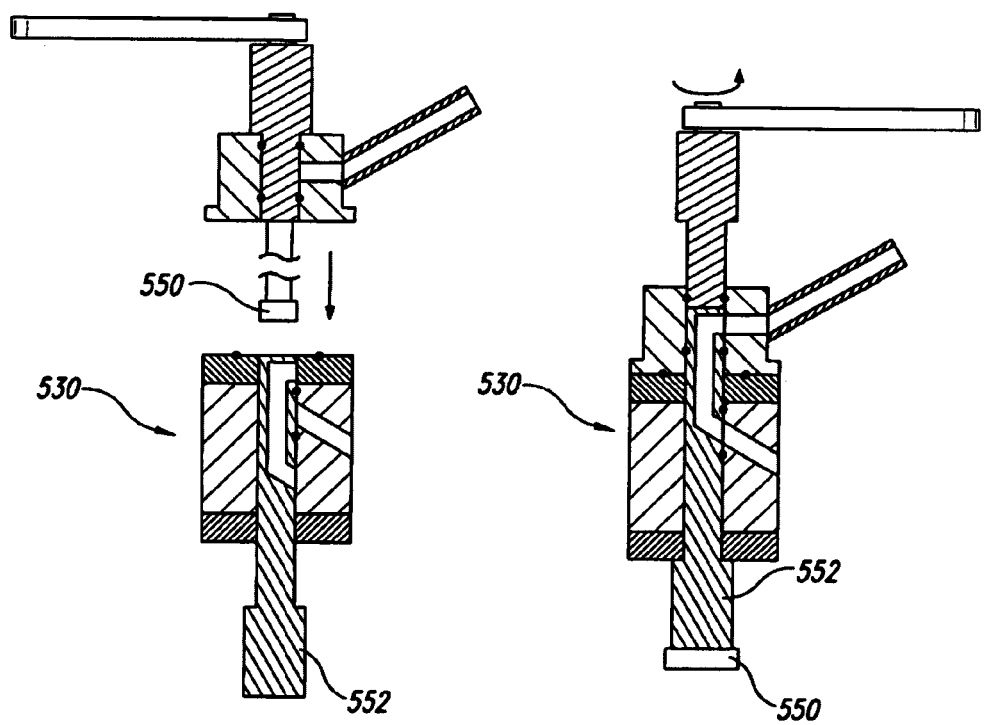
FIG. 6A is a side cross-sectional view taken along line 6A of FIG. 4 of the exemplary fluid transfer interlock mechanism shown in FIGS. 4 and 5, wherein the fluid transfer interlock mechanism is shown in a disengaged and unlocked arrangement.
FIG. 6B is a side cross-sectional view taken along line 6B of FIG. 5 of the exemplary fluid transfer interlock mechanism shown in FIGS. 4 and 5, wherein the fluid transfer interlock mechanism is shown in an engaged and locked arrangement.
Figure 7A:
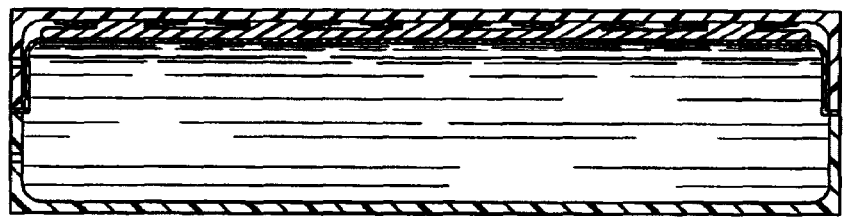
FIG. 7A is a side cross-sectional view of detachable cartridge in accordance with an embodiment of the present invention, wherein a first compressible reactant reservoir is shown as being completely filled with a liquid reactant.
Figure 7B:
FIG. 7B is a side cross-sectional view of the detachable cartridge shown in FIG. 7A, wherein the first compressible reactant reservoir is shown as being partially filled with the liquid reactant and a first expandable effluent reservoir is shown as being partially filled with a liquid effluent.
Figure 7C:
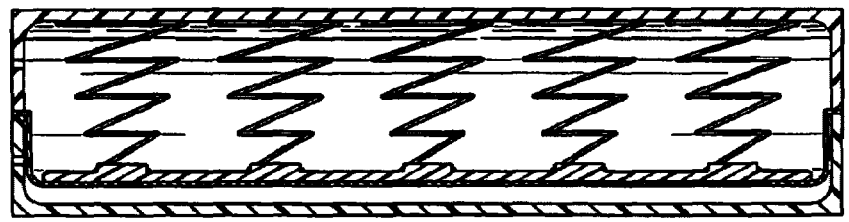
FIG. 7C is a side cross-sectional view of the detachable cartridge shown in FIGS. 7A–B, wherein the first compressible reactant reservoir is shown as being substantially empty and the first expandable effluent reservoir is shown as completely filled with the liquid effluent.
Figure 8:
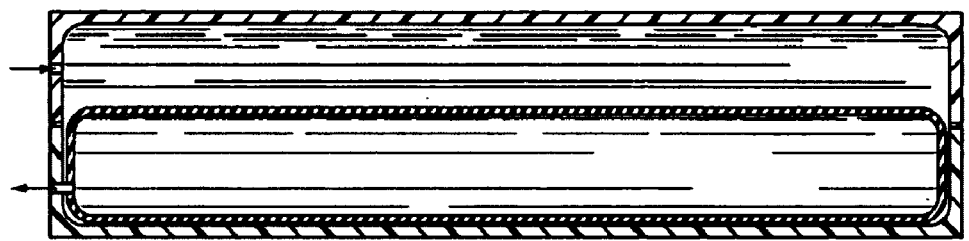
FIG. 8 is a side cross-sectional view of a detachable cartridge in accordance with an alternative embodiment of the present invention, wherein a collapsible bag separates a first reactant reservoir from a first effluent reservoir.
Figure 9:
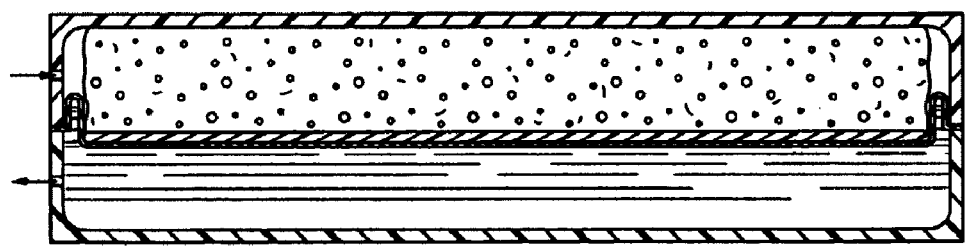
FIG. 9 is a side cross-sectional view of a detachable cartridge in accordance with an embodiment of the present invention, wherein an expandable sponge (shown partially expanded) is used within a first expandable effluent reservoir in lieu of compressed springs.

FIGS. 5 and 6A–B show further details of the above-described fluid transfer interlock mechanism 528, which mechanism is configured to fluidicly connect and lock together a stack assembly (contained with a stack assembly housing) and a detachable cartridge. The purpose of the fluid transfer interlock mechanism 528 is to transfer the reactants and effluent on demand without leakage when the detachable cartridge is engaged to the stack assembly. When the detachable cartridge is detached, each fluid connector (i.e., the main fluid connector assembly 528 and the cartridge fluid connector assembly 530) seals completely and retains the fuel cell system's fluids without leakage. This operation is commonly achieved by what is termed a "dry break seal." In this configuration, a lock and key mechanism is designed to ensure that fluids are transferred only when the correct cartridge is properly attached to the correct stack assembly. As shown, the key 550 is designed to enter the cartridge fluid connector assembly 530 and engage a lock mechanism 552. When retracting, the key 550 pulls sliding fluid pins (not shown) from the cartridge fluid connector assembly 530 into the main fluid connector assembly 528, thus pushing back fluid plus (not shown).

Figure 10A:
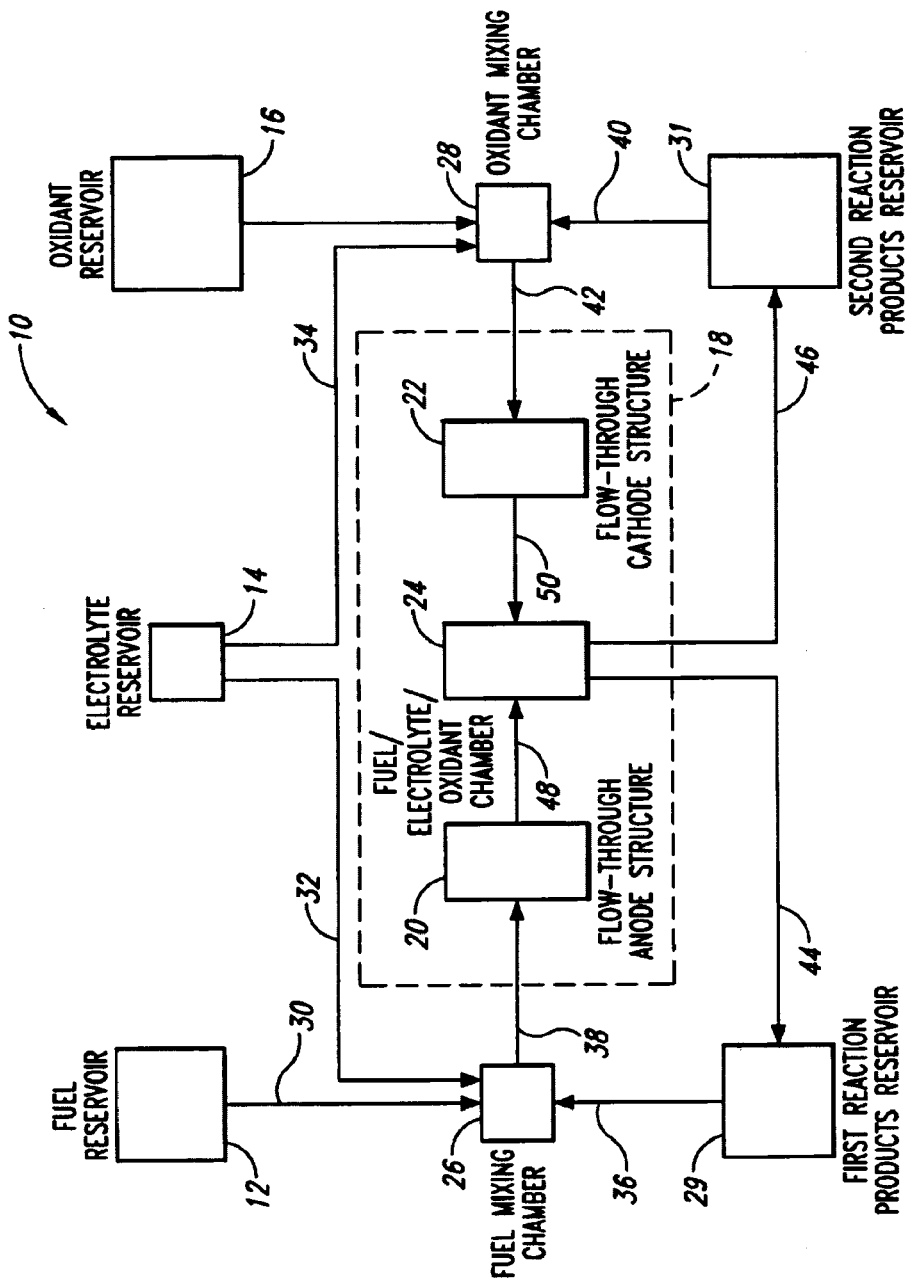
FIG. 10A is a schematic representation of a two-flow flow regime (associated with a direct circulating fuel/electrolyte/oxidant fuel cell system) in accordance with an embodiment of an invention disclosed herein; the flow regime may be characterized in that a fuel/electrolyte flow stream and an oxidant/electrolyte flow stream both first flow through respective opposing anode and cathode structures of an electrode pair assembly and inwardly towards a central longitudinal axis of the electrode pair assembly; the fuel/electrolyte flow stream and the oxidant/electrolyte flow stream then flow along the central longitudinal axis.

In other embodiments (exemplary embodiments that have been schematically represented in FIGS. 10A–B and 11A–B), the present invention is directed to direct circulating fuel/electrolyte/oxidant fuel cell systems adapted to electrochemically react a fuel with an oxidant to yield electrical energy and reaction products. In this regard, FIG. 10A depicts a schematic representation of a two-flow flow regime (associated with a direct circulating fuel/electrolyte/oxidant fuel cell system); the flow regime may be characterized in that a fuel/electrolyte flow stream and an oxidant/electrolyte flow stream both first flow through respective opposing anode and cathode structures of an electrode pair assembly and inwardly towards a central longitudinal axis of the electrode pair assembly; the fuel/electrolyte flow stream and the oxidant/electrolyte flow stream then flow along the central longitudinal axis.

Figure 10B:
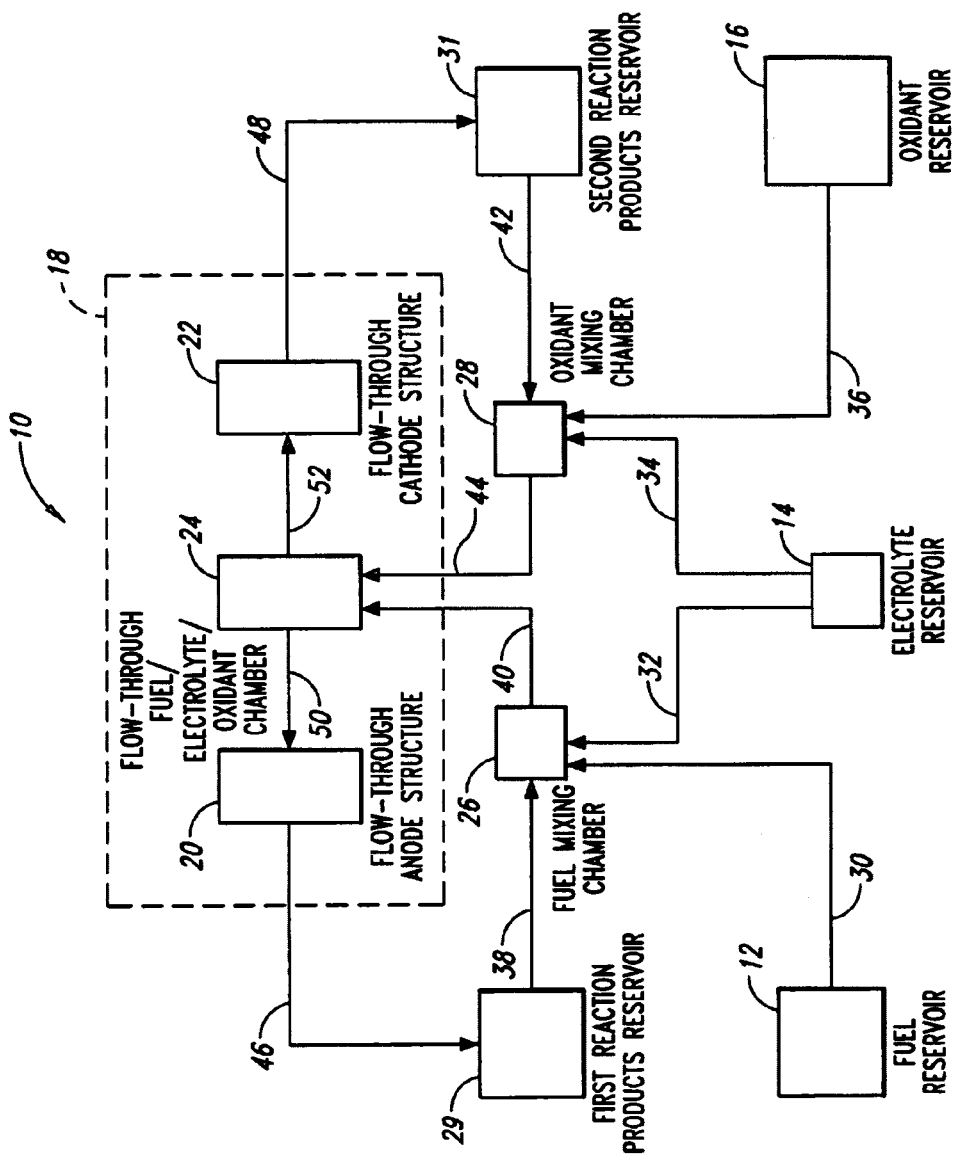
FIG. 10B is a schematic representation of a two-flow flow regime (associated with a direct circulating fuel/electrolyte/oxidant fuel cell system) in accordance with an embodiment of an invention disclosed herein; the flow regime may be characterized in that a fuel/electrolyte flow stream and an oxidant/electrolyte flow stream both first flow along a central longitudinal axis of an electrode pair assembly; the fuel/electrolyte flow stream and the oxidant/electrolyte flow stream then flow outwardly away from the central longitudinal axis and through the respective opposing anode and cathode structures.

FIG. 10B is a schematic representation of a two-flow flow regime (associated with a direct circulating fuel/electrolyte/oxidant fuel cell system) in accordance with another embodiment of the present invention. This alternative flow regime may be characterized in that a fuel/electrolyte flow stream and an oxidant/electrolyte flow stream both first flow along a central longitudinal axis of an electrode pair assembly; the fuel/electrolyte flow stream and the oxidant/electrolyte flow stream then flow outwardly away from the central longitudinal axis and through the respective opposing anode and cathode structures.

Figure 11A:
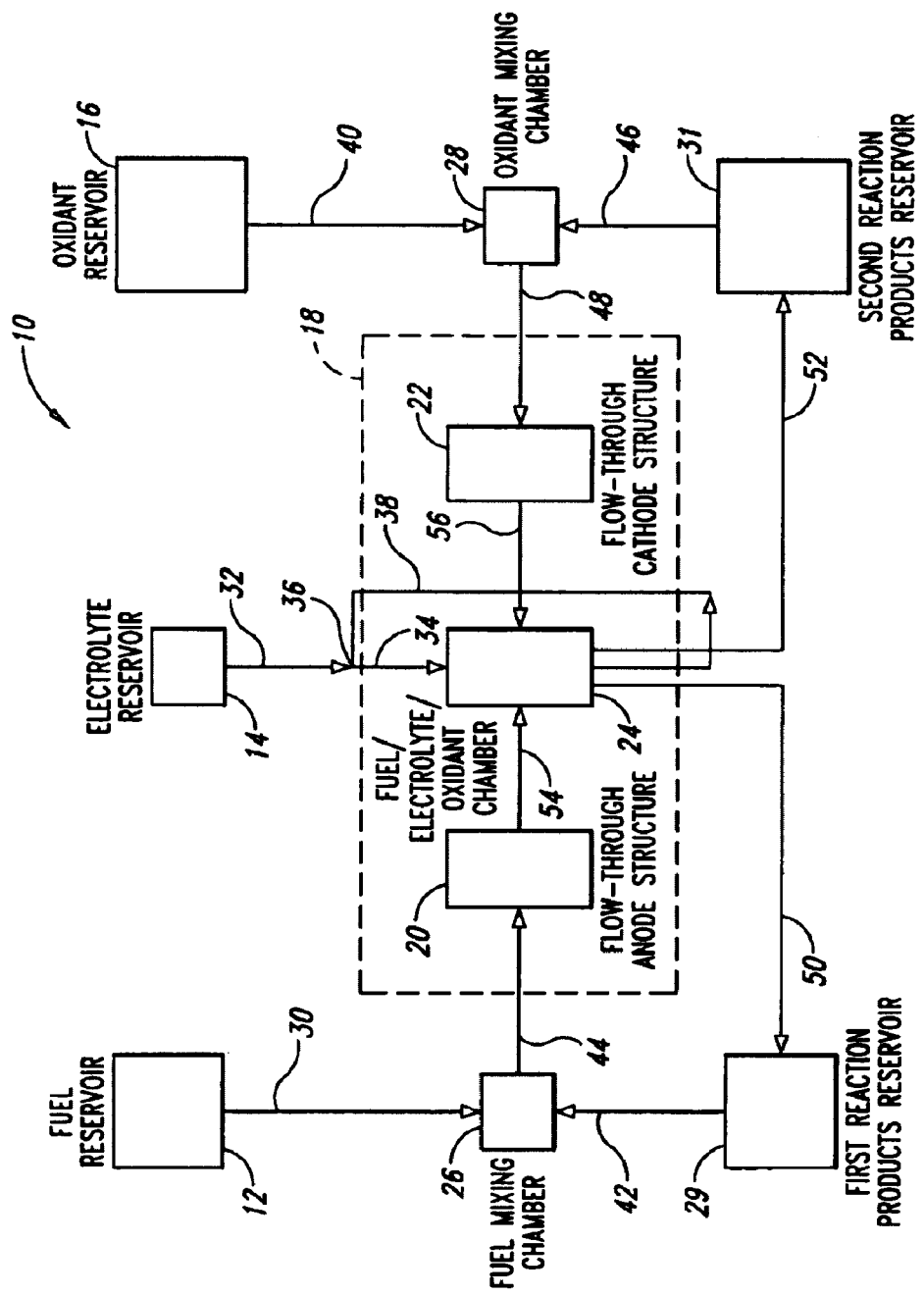
FIG. 11A is a schematic representation of a three-flow flow regime (associated with a direct circulating fuel/electrolyte/oxidant fuel cell system) in accordance with an embodiment of an invention disclosed herein; the flow regime may be characterized in that a fuel/electrolyte flow stream and an oxidant/electrolyte flow stream both first flow through respective opposing anode and cathode structures of an electrode pair assembly and inwardly towards a central longitudinal axis of the electrode pair assembly; the fuel/electrolyte flow stream and the oxidant/electrolyte flow stream then flow along the central longitudinal axis; in addition, a third electrolyte stream simultaneously flows along the central longitudinal axis.

FIG. 11A is a schematic representation of a three-flow flow regime (associated with a direct circulating fuel/electrolyte/oxidant fuel cell system) in accordance with yet another embodiment of the present invention. The flow regime may be characterized in that a fuel/electrolyte flow stream and an oxidant/electrolyte flow stream both first flow through respective opposing anode and cathode structures of an electrode pair assembly and inwardly towards a central longitudinal axis of the electrode pair assembly; the fuel/electrolyte flow stream and the oxidant/electrolyte flow stream then flow along the central longitudinal axis; in addition, a third electrolyte stream simultaneously flows along the central longitudinal axis.

Figure 11B:
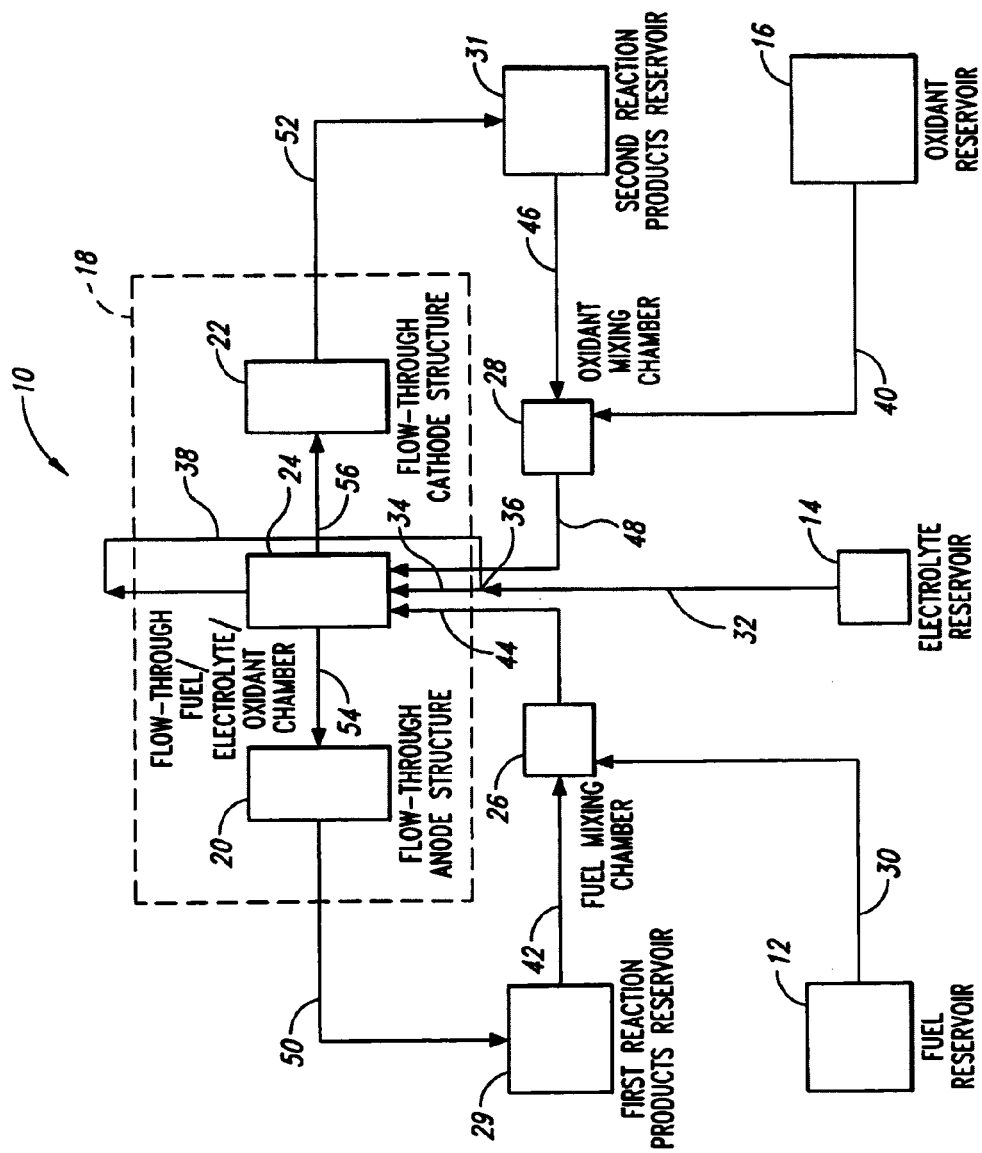
FIG. 11B is a schematic representation of a three-flow flow regime (associated with a direct circulating fuel/electrolyte/oxidant fuel cell system) in accordance with an embodiment of an invention disclosed herein; the flow regime may be characterized in that a fuel/electrolyte flow stream and an oxidant/electrolyte flow stream both first flow along a central longitudinal axis of an electrode pair assembly; the fuel/electrolyte flow stream and the oxidant/electrolyte flow stream then flow outwardly away from the central longitudinal axis and through the respective opposing anode and cathode structures; in addition, a third electrolyte stream simultaneously flows along the central longitudinal axis.

FIG. 11B is a schematic representation of a three-flow flow regime (associated with a direct circulating fuel/electrolyte/oxidant fuel cell system) in accordance with still another embodiment of the present invention. This alternative flow regime may be characterized in that a fuel/electrolyte flow stream and an oxidant/electrolyte flow stream both first flow along a central longitudinal axis of an electrode pair assembly; the fuel/electrolyte flow stream and the oxidant/electrolyte flow stream then flow outwardly away from the central longitudinal axis and through the respective opposing anode and cathode structures; in addition, a third electrolyte stream simultaneously flows along the central longitudinal axis.

The flow paths associated with each of the direct circulating fuel/electrolyte/oxidant fuel cell systems set forth above and schematically represented in FIGS. 10A–B and 11A–B are unique because each has its own distinctive flow-stream flow pattern or regime. Although each flow pattern or regime is distinctive, there is, however, several common system components associated with each of the illustrated direct circulating fuel/electrolyte/oxidant fuel cell systems. More specifically (and as shown in FIGS. 10A–B and 11A–B), each of the direct circulating fuel/electrolyte/oxidant fuel cell systems 10 comprise: a fuel reservoir 12 for holding the fuel; an electrolyte reservoir 14 (optional in some embodiments) for holding the electrolyte; an oxidant reservoir 16 for holding the oxidant; and one or more electrode pair assemblies 18 for reacting the fuel and the oxidant. Each of the one or more electrode pair assemblies 18 further comprises a flow-through anode structure 20 derived from a first substantially planar substrate; a flow-through cathode structure 22 derived from a second substantially planar substrate; and a flow-through fuel/electrolyte/oxidant chamber 24. Although not shown, it is to be understood that the flow-through anode structure 20 and the flow-through cathode structure 22 are spaced apart and substantially parallel to each other so as to define a spaced apart region (not shown). The flow-through fuel/electrolyte/oxidant chamber 24 generally resides within the spaced apart region.

The fuel associated with each of the direct circulating fuel/electrolyte/oxidant fuel cell systems 10 may be an organic fuel such as, for example, ethanol, propanol, methanol, or a combination thereof; the oxidant may be oxygen, hydrogen peroxide, or a combination thereof; the reaction products are generally carbon dioxide and water; and the electrolyte may comprise an acid such as, for example, phosphoric acid, sulfuric acid, trifluoromethane sulfonic acid, difluoromethane diphosphoric acid, diflouromethane disulfonic acid, trifluoroacetic acid, or a combination thereof. In addition, each of the direct circulating fuel/electrolyte/oxidant fuel cell systems 10 shown in FIGS. 10–11 may also comprise a detachable fuel/electrolyte/oxidant cartridge (not shown), wherein the detachable fuel/electrolyte/oxidant cartridge contains (i) the fuel reservoir, (ii) the optional electrolyte reservoir, and (iii) the oxidant reservoir.

In addition to the foregoing, each of the direct circulating fuel/electrolyte/oxidant fuel cell systems 10 shown in FIGS. 10–11 also comprise: a fuel mixing zone 26 for mixing a selected amount of the fuel together with a selected amount of the electrolyte; and an oxidant mixing zone 28 for mixing a selected amount of the oxidant together with a selected amount of the electrolyte. It is to be understood that the fuel mixing zone 26 may be a fuel mixing chamber or a fuel mixing junction; similarly, the oxidant mixing zone 28 may be an oxidant mixing chamber or an oxidant mixing junction. In addition, each of the direct circulating fuel/electrolyte/oxidant fuel cell systems 10 shown also comprise a first reaction products reservoir 29 for holding a first portion of the reaction products, and a second reaction products reservoir 31 for holding a second portion of the reaction products. Moreover, the first and second reaction product reservoirs may within the fuel reservoir, the optional electrolyte reservoir, the oxidant reservoir, or a combination thereof. Therefore, it is to be understood that the first and second reaction product reservoirs may be within the aforementioned detachable cartridge; in this way, the reaction products may eventually occupy the space left behind from the fuel, oxidant, and/or electrolyte as each is consumed by the fuel cell system 10. Although the first and second reaction product reservoirs may within the fuel reservoir, the optional electrolyte reservoir, the oxidant reservoir, or a combination thereof and occupy the same space within the detachable cartridge, they are preferably physically separated from one another by one or more appropriately sized interposing expandable and liquid impermeable membranes.

In view of the foregoing, each of the direct circulating fuel/electrolyte/oxidant fuel cell systems 10 shown in FIGS. 10–11 may be distinguished from one another as follows. In the direct circulating fuel/electrolyte/oxidant fuel cell systems 10 shown in FIG. 5A, the fuel reservoir 12 is fluidicly connected to the fuel mixing zone 26 via a first fuel flow stream conduit 30; and the optional electrolyte reservoir 14 is optionally fluidicly connected to (i) the fuel mixing zone 26 via a first electrolyte flow stream conduit 32 and (ii) the oxidant mixing zone 28 via a second electrolyte flow stream conduit 34; and the oxidant reservoir 16 is fluidicly connected to the oxidant mixing zone 28 via a first oxidant flow stream conduit 36. In addition, the fuel mixing zone 26 is further fluidicly connected to (i) the first reaction products reservoir 29 via a first reaction products flow stream conduit 36, and (ii) the flow-through anode structure 20 via a first fuel/electrolyte/reaction products flow stream conduit 38; and wherein the oxidant mixing zone 28 is further fluidicly connected to (i) the second reaction products reservoir 31 via a second reaction products flow stream conduit 40, and (ii) the flow-through cathode structure 22 via a first oxidant/electrolyte/reaction products flow stream conduit 42; and wherein the first reaction products reservoir 29 is further fluidicly connected to the flow-through fuel/electrolyte/oxidant chamber 24 via a third reaction products flow stream conduit 44; and wherein the second reaction products reservoir 31 is further fluidicly connected to the flow-through fuel/electrolyte/oxidant chamber 24 via a fourth reaction products stream conduit 46; and wherein the flow-through fuel/electrolyte/oxidant chamber 24 is further fluidicly connected to (i) the flow-through anode structure 20 via a second fuel/electrolyte/reaction products flow stream conduit 48, and (ii) the flow-through cathode structure 22 via a second oxidant/electrolyte/reaction products flow stream conduit 50.

In the direct circulating fuel/electrolyte/oxidant fuel cell systems 10 shown in FIG. 10B, the fuel reservoir 12 is fluidicly connected to the fuel mixing zone 26 via a first fuel flow stream conduit 30; and wherein the optional electrolyte reservoir 14 is optionally fluidicly connected to (i) the fuel mixing zone 26 via a first electrolyte flow stream conduit 32 and (ii) the oxidant mixing zone 28 via a second electrolyte flow stream conduit 34; and wherein the oxidant reservoir 16 is fluidicly connected to the oxidant mixing zone 28 via a first oxidant flow stream conduit 36. In addition, the fuel mixing zone 26 is further fluidicly connected to (i) the first reaction products reservoir 29 via a first reaction products flow stream conduit 38, and (ii) the flow-through fuel/electrolyte/oxidant chamber 24 via a first fuel/electrolyte/reaction products flow stream conduit 40; and wherein the oxidant mixing zone 28 is further fluidicly connected to (i) the second reaction products reservoir 31 via a second reaction products flow stream conduit 42, and (ii) the flow-through fuel/electrolyte/oxidant chamber 24 via a first oxidant/electrolyte/reaction products flow stream conduit 44; and wherein the first reaction products reservoir 29 is further fluidicly connected to the flow-through anode structure 20 via a third reaction products flow stream conduit 46; and wherein the second reaction products reservoir 31 is further fluidicly connected to the flow-through cathode structure 22 via a fourth reaction products stream conduit 48; and wherein the flow-through fuel/electrolyte/oxidant chamber 24 is further fluidically connected to (i) the flow-through anode structure 20 via a second fuel/electrolyte/reaction products flow stream conduit 50, and (ii) the flow-through cathode structure 22 via a second oxidant/electrolyte/reaction products flow stream conduit 52.

In the direct circulating fuel/electrolyte/oxidant fuel cell systems 10 shown in FIG. 11A, the fuel reservoir 12 is fluidically connected to the fuel mixing zone 26 via a first fuel flow stream conduit 30; and wherein the optional electrolyte reservoir 14 is optionally fluidically connected to the flow-through fuel/electrolyte/oxidant chamber 24 via an optional first electrolyte flow stream conduit 32 that is fluidically connected to a second electrolyte flow stream conduit 34, wherein the first and second electrolyte flow stream conduits 32, 34 are fluidically connected together at an electrolyte flow stream junction 36, wherein the electrolyte flow stream junction 36 is further fluidically connected to the flow-through fuel/electrolyte/oxidant chamber via a third recycle loop electrolyte flow stream conduit 38; and wherein the oxidant reservoir 16 is fluidically connected to the oxidant mixing zone 28 via a first oxidant flow stream conduit 40. In addition, the fuel mixing zone 26 is fluidically connected to (i) the first reaction products reservoir 29 via a first reaction products flow stream conduit 42, and (ii) the flow-through anode structure 20 via a first fuel/electrolyte/reaction products flow stream conduit 44; and wherein the oxidant mixing zone 28 is fluidically connected to (i) the second reaction products reservoir 31 via a second reaction products flow stream conduit 46, and (ii) the flow-through cathode structure 22 via a first oxidant/electrolyte/reaction products flow stream conduit 48; and wherein the first reaction products reservoir 29 is further fluidically connected to the flow-through fuel/electrolyte/oxidant chamber 24 via a third reaction products flow stream conduit 50; and wherein the second reaction products reservoir 31 is further fluidically connected to the flow-through fuel/electrolyte/oxidant chamber 24 via a fourth reaction products stream conduit 52; and wherein the flow-through fuel/electrolyte/oxidant chamber 24 is further fluidically connected to (i) the flow-through anode structure 20 via a second fuel/electrolyte/reaction products flow stream conduit 54, and (ii) the flow-through cathode structure 22 via a second oxidant/electrolyte/reaction products flow stream conduit 56.

In the direct circulating fuel/electrolyte/oxidant fuel cell systems 10 shown in FIG. 11B, the fuel reservoir 12 is fluidically connected to the fuel mixing zone 26 via a first fuel flow stream conduit 30; and wherein the optional electrolyte reservoir 14 is optionally fluidically connected to the flow-through fuel/electrolyte/oxidant chamber 24 via first and second electrolyte flow stream conduits 32, 34, wherein the first and second electrolyte flow stream conduits 32, 34 are fluidically connected together at an electrolyte flow stream junction 36, wherein the electrolyte flow stream junction 36 is further fluidically connected to the flow-through fuel/electrolyte/oxidant chamber 24 via a third recycle loop electrolyte flow stream conduit 38; and wherein the oxidant reservoir 16 is fluidically connected to the oxidant mixing zone 28 via a first oxidant flow stream conduit 40. In addition, the fuel mixing zone 26 is fluidically connected to (i) the first reaction products reservoir 29 via a first reaction products flow stream conduit 42, and (ii) the flow-through fuel/oxidant/reaction products chamber 24 via a first fuel/electrolyte/reaction products flow stream conduit 44; and wherein the oxidant mixing zone 28 is fluidically connected to (i) the second reaction products reservoir 31 via a second reaction products flow stream conduit 46, and (ii) the flow-through fuel/oxidant/reaction products chamber 24 via a first oxidant/electrolyte/reaction products flow stream conduit 48; and wherein the first reaction products reservoir 29 is further fluidically connected to the flow-through anode structure 20 via a third reaction products flow stream conduit 50; and wherein the second reaction products reservoir 29 is further fluidically connected to the flow-through cathode structure 22 via a fourth reaction products stream conduit 52; and wherein the flow-through fuel/electrolyte/oxidant chamber 24 is further fluidically connected to (i) the flow-through anode structure 20 via a second fuel/electrolyte/reaction products flow stream conduit 54, and (ii) the flow-through cathode structure 22 via a second oxidant/electrolyte/reaction products flow stream conduit 56.

In view of the foregoing, it is also to be understood that the various flow stream conduits may be dimensioned such that the fluid flow is characterized by a low Reynolds number and is thus laminar. It is also to be understood that the various flow stream conduits may be microfluidic flow stream conduits.

In still further embodiments, the present invention is directed to computer systems having fuel cell sub-system components, wherein a computer processing component of each of the computer systems is adapted to control one or more process control variables associated with each fuel cell sub-system component. For example, it is contemplated that the afore-described detachable stack assembly housing may include a fluid control block for controlling the velocity of each of the fluids (e.g., the fuel/electrolyte flow stream, the oxidant/electrolyte flow stream, and the optional electrolyte flow stream). Thus, the fluid control block may include, for example, flow sensors for sensing the velocity of the various flow streams together with associated electronic circuitry for reporting the velocities to the computer processing component. The computer processing component may then adjust in-line microvalves to achieve desired flow velocities needed for proper operation of the fuel cell system.

Thus, and as appreciated by those skilled in the art, an exemplary computer system for controlling one or more process control variables (associated with a fuel cell sub-system component) includes a general purpose computing device in the form of a conventional personal such as a laptop computer or other devices that includes a central processing unit (CPU), a system memory, and a system bus that couples various system components, including the system memory, to the CPU. The system bus may be any of several types of bus structures including a memory bus or memory controller, a peripheral bus, and a local bus using any of a variety of bus architectures. The system bus may also include a power bus.

The system memory generally includes read only memory (ROM) and random access memory (RAM). A basic input/output system 114, containing the basic routine that helps to transfer information between elements within the computer 102, such as during start-up, may be stored in ROM.

The personal computer generally further includes input/output devices, such as a hard disk drive for reading from and writing to a hard disk, not shown, a magnetic disk drive for reading from or writing to a removable magnetic disk, and an optical disk drive for reading from or writing to a removable optical disk, such as a CD ROM or other optical media. The hard disk drive, magnetic disk drive, and optical disk drive are connected to the system bus by a hard disk drive interface, a magnetic disk drive interface, and an optical drive interface, respectively. The disk drives and their associated computer-readable media provide nonvolatile storage of computer readable instructions, data structures, program modules and other data for the computer. Although the exemplary environment described herein employs a hard disk, a removable magnetic disk and a removable optical disk, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

In view of the foregoing description of an exemplary computer system, it is contemplated that the CPU (i.e., computer processing component) of such a computer system may be used to control one or more process control variables (e.g., flow rates, temperatures, pressures, concentrations, et cetera) associated with each fuel cell sub-system component. Thus, the computer processing component (having appropriate software) may interface with the fuel cell subsystem component be receiving and processing information from one or more fuel cell system sensors, and then instructing appropriate control actions to adjust the values of certain adjustable variables such as, for example, flow rate or concentration. In this way, a fuel cell system may be readily integrated with a computer system.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

The invention claimed is:

1. A reactant supply cartridge adapted for use with a closed liquid feed fuel cell system, the cartridge having at least first and second volumes, comprising:
   a first reactant reservoir for holding a first reactant, the first reactant reservoir being configured to occupy substantially all of the first volume when filled with the first reactant;
   a second reactant reservoir for holding a second reactant, the second reactant reservoir being configured to occupy substantially all of the second volume when filled with the second reactant; and
   an effluent reservoir for holding effluent produced by the fuel cell system, the effluent reservoir being configured to occupy, when filled with the effluent produced by the fuel cell system, a portion of the first volume, a portion of the second volume, or a portion of the first and second volumes.

2. The reactant supply cartridge of claim 1 further comprising an electrolyte reservoir for holding an electrolyte.

3. The reactant supply cartridge of claim 1, wherein the cartridge is made of a rigid plastic.

4. The reactant supply cartridge of claim 1, wherein the first or second reactant reservoir is separated from the effluent reservoir by an interposing bladder member.

5. A reactant supply cartridge adapted for use with a liquid feed fuel cell system, the cartridge having at least first and second volumes, comprising:
   a fuel mixture reservoir for holding a liquid fuel mixture, wherein the fuel mixture reservoir occupies substantially all of the first volume when filled with the liquid fuel mixture;
   an oxidant mixture reservoir for holding a liquid oxidant mixture, wherein the oxidant mixture reservoir occupies substantially all of the second volume when filled with the liquid oxidant mixture;
   an anodic wastestream reservoir for holding an anodic wastestream, wherein the anodic wastestream reservoir occupies substantially all of the first volume when filled with the anodic wastestream, the anodic wastestream reservoir being separated from the fuel mixture reservoir by an interposing first partitioning member;
   a cathodic wastestream reservoir for holding a cathodic wastestream, wherein the cathodic wastestream occupies substantially all of the second volume when filled with the cathodic wastestream, the cathodic wastestream reservoir being separated from the oxidant mixture reservoir by an interposing second partitioning member;
   a fuel mixture outlet connected to the fuel mixture reservoir, the fuel mixture outlet being adapted to flow the liquid fuel mixture, when present, out of the fuel mixture reservoir;
   an oxidant mixture outlet connected to the oxidant mixture reservoir, the oxidant mixture outlet being adapted to flow the liquid oxidant mixture, when present, out of the oxidant mixture reservoir;
   a cathodic wastestream inlet connected to the cathodic wastestream reservoir, the cathodic wastestream inlet being adapted to flow the cathodic wastestream, when present, into the cathodic wastestream reservoir; and
   an anodic wastestream inlet connected to the anodic wastestream reservoir, the anodic wastestream inlet being adapted to flow the anodic wastestream, when present, into the anodic wastestream reservoir.

6. The reactant supply cartridge of claim 5 wherein the liquid fuel mixture is a methanol solution and the liquid oxidant mixture is a hydrogen peroxide solution.

* * * * *